Dec. 12, 1933.    W. F. SCHULZ    1,939,417
CONCRETE REENFORCING AND TYING MEANS
Filed Jan. 23, 1933    2 Sheets-Sheet 1
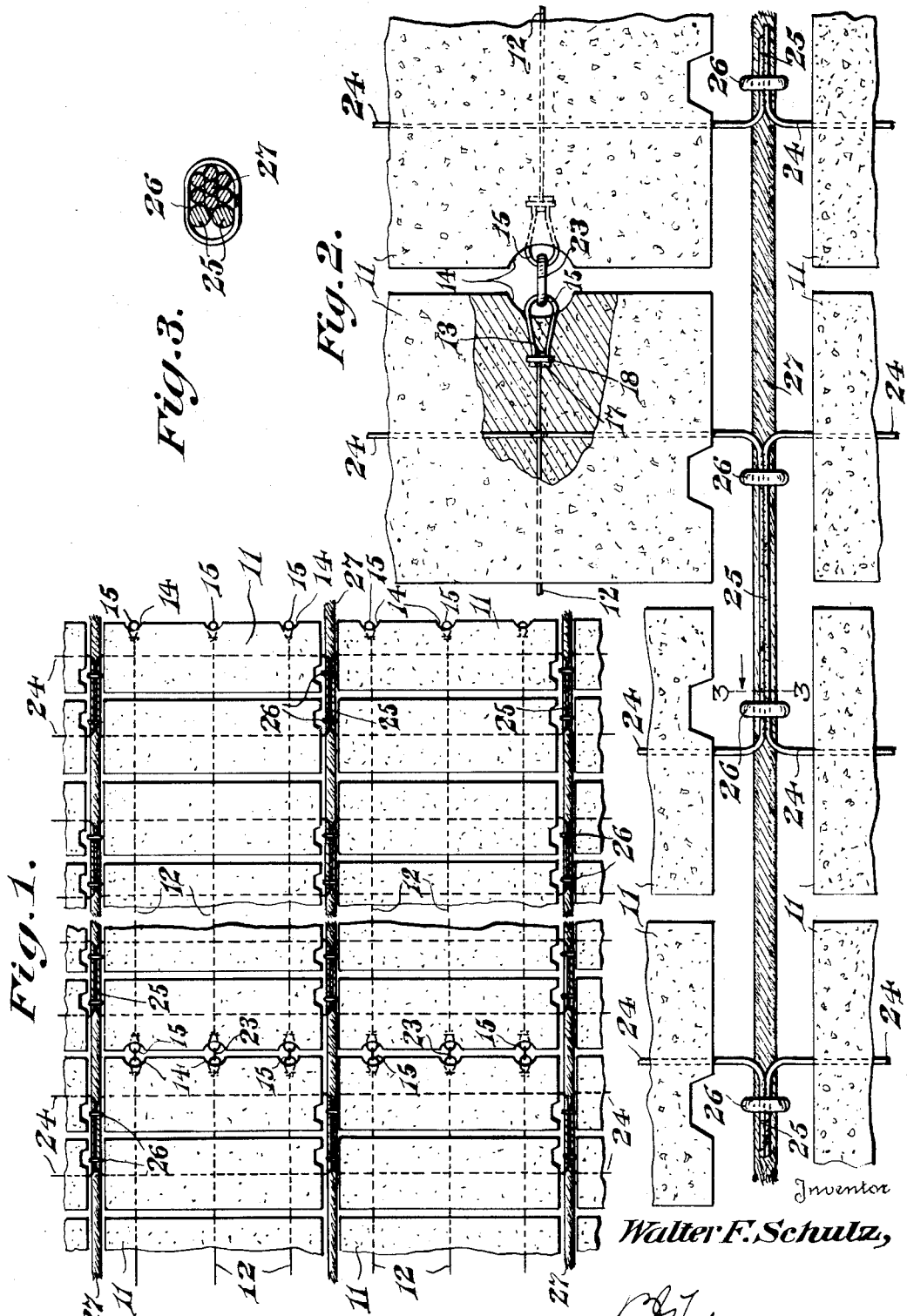
Inventor
Walter F. Schulz, Dec. 12, 1933.  W. F. SCHULZ  1,939,417
CONCRETE REENFORCING AND TYING MEANS
Filed Jan. 23, 1933  2 Sheets-Sheet 2
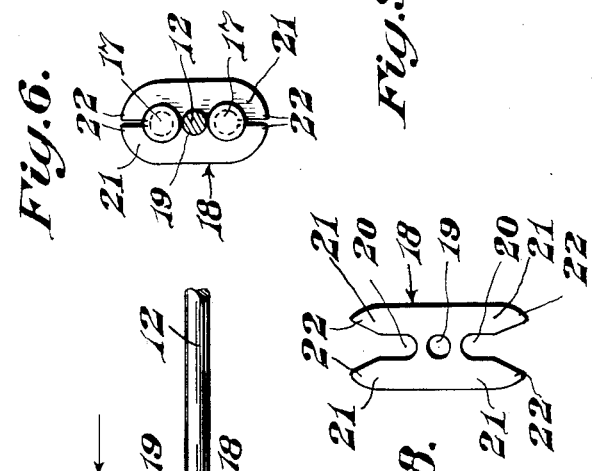
Inventor
*Walter F. Schulz,*
By
Attorney Patented Dec. 12, 1933

1,939,417

UNITED STATES PATENT OFFICE 1,939,417

CONCRETE REENFORCING AND TYING MEANS

Walter F. Schulz, Youngstown, Ohio, assignor to Truscon Steel Company, Youngstown, Ohio, a corporation of Michigan Application January 23, 1933. Serial No. 653,134

6 Claims. (Cl. 61—38)

In the production of concrete structures and particularly those subject to material corrosive conditions, as for example, flexible concrete mattresses for revetment work in rivers, it has been found that high copper content wires or rods have proven most satisfactory, but when the same are drawn to their ultimate tensile strength, approximately 140,000 pounds per square inch, they cannot be sharply bent or scored without reducing the tensile strength in proportion to the extent of bending or scoring.

It has also been established that with a silicon content of approximately 3% and a tin or manganese content of 1%, these rods or wires have resistance welding properties substantially equivalent to mild steel. However, it has also been found that they cannot be welded without vitiating some of their tensile strength, depending on variation in weld penetration and pressure at the time of welding. As an example, a controlled heat and pressure in welding wires of approximately .192 diameter at right angle intersections, producing a weld with approximately 400 pounds shear value, reduces the tensile strength of the wires at the weld approximately 10% or from 4,000 pounds to 3,600 pounds. A greater weld penetration, while producing a more perfect union of the two wires, results in further reducing the tensile strength. If the practice is carried to the limit, the tensile strength of the wires at the intersection will be reduced to the point of the physical properties of the wire in the annealed state, or approximately 60,000 pounds per square inch, or in the case of the wire used as an illustration, the tensile strength is reduced from a maximum of 4,000 to 1,700 pounds.

The above facts have demonstrated that to form a sharp loop on the end of a highly stressed wire and which would be capable of carrying the full tensile strength of the wire without slip, it must be constructed without sharp bends or twists of the wire forming the loop, and also without scoring the wire and without welding.

The primary object of the present invention is to provide in connection with a concrete or like structure, a reenforcing means that may have the desired tensile strength, with the necessary terminal tie loops so connected thereto that at their place of formation or juncture there will be no weakness developed, in that scoring, sharp bending and welding are eliminated.

In the accompanying drawings:

Figure 1 is a plan view of a portion of a flexible concrete mattress that may be employed for river revetment work, though the invention is not restricted to such use.

Figure 2 is a detail view of a portion of the same on an enlarged scale.

Figure 3 is a sectional view on the line 3—3 of Figure 2.

Figure 4 is a plan view of one of the reenforcing and tie rods or wires showing the terminal loop formation.

Figure 5 is a detail sectional view on an enlarged scale through one of the terminal members.

Figures 6 and 7 are sectional views respectively on the lines 6—6 and 7—7 of Figure 5.

Figure 8 is a detail view in elevation of one of the connectors, before assembly.

Figure 9 is a perspective view of the connector detached from the other parts, but after its final formation.

Figure 10 is a detail view of one of the tie rods or wires.

In the embodiment disclosed a plurality of sets of elongated concrete blocks or slabs 11 are employed. The blocks of each set are located side by side in slightly spaced relation and are connected by reenforcing and tie rods 12 embedded therein and extending transversely through the same and across the spaces between them. These tie rods 12 are preferably made of wire of high copper content drawn to its ultimate tensile strength, which in actual practice is approximately 140,000 pounds per square inch. As shown particularly in Figures 4, 5 and 10 the ends of each rod are enlarged or in other words provided with integral heads 13, and the rods, it will be noted by reference to Figures 1 and 2, terminate short of the outside edges of the outermost slabs 11 of the set. These outside edges or margins are preferably notched, as shown at 14, the said notches being in line with the embedded ends of the rods or wires 12.

Located in the notches 14 are the exposed closed ends 15 of terminal loops, having side arms 16 that are embedded in the material of the outermost slabs and overlap and are located on opposite sides of the terminal portions of the wires or rods 12. The free ends of the side rods 16 are also provided with integral heads 17.

In order to secure together the rods or loops, connectors 18 are provided. As shown these connectors are in the form of plates having central openings 19 and open-sided sockets 20 on opposite sides of the same, producing arms 21 whose outer ends 22 are preferably tapered. A pair of these connectors is placed on each rod 12 before both heads 13 are upset, and are thus held against detachment from the rod by reason of said heads 13.

In assembling the parts the free ends of the side arms are slipped into the open-sided sockets 20, with the heads 17 on the inner side of the connector, or in other words on the opposite sides to the heads 13 of the rod 12. The open ends are then closed by bending inwardly the terminal portions 22, as will be clear by a comparison of Figure 8 with Figures 6, 7 and 9. The consequence is that an effective connection is produced between the terminal loops and the rods 12, which eliminates any necessity of sharply twisting or scoring either the rods or the loops and also eliminates the necessity for welding the two parts together. As will be clear by reference to Figure 2 the connections are embedded in the material of the slabs and only the closed ends are exposed.

As will be clear by reference to Figures 1 and 2 each set of slabs held together by a set of tie rods, is connected to an alined set by suitable loops 23, thus producing a line of slabs of any desired or workable length. A mat is usually made of a plurality of these lines of slabs. For that purpose transversely disposed reenforcing loops 24 are employed, having their sides embedded in adjacent slabs, with their ends projecting, and these exposed ends, designated 25, are preferably fastened by loops 26 to cables 27 that run lengthwise between the rows of slabs.

From the foregoing, it is thought that the construction, operation and many advantages of the herein described invention will be apparent to those skilled in the art without further description, and it will be understood that various changes in the size, shape, proportion and minor details of construction may be resorted to without departing from the spirit or sacrificing any of the advantages of the invention.

What I claim, is:

1. A loop structure for rods, wires and the like of high tensile strength, comprising a headed body rod, a loop having headed ends, and a connector embracing the ends of the body rod and loop and interposed between the heads thereof.

2. A loop structure for rods, wires and the like of high tensile strength, comprising a headed body rod, a loop having headed ends, the head of the body rod being located between the ends of the loop on the inner sides of the heads thereof, and a connector interposed between the heads of the loop and the head of the body rod.

3. A loop structure for rods, wires and the like of high tensile strength, comprising a headed body rod, a loop having headed ends, the head of the body rod being located between the ends of the loop on the inner sides of the heads thereof, the opposite sides of the body head overlapping the opposing inner sides of the loop heads, and means for holding the heads in assembled relation.

4. A loop structure for rods, wires and the like of high tensile strength, comprising a tie plate having a central opening and oppositely outstanding open ended sockets, a headed body rod extending through the opening, and a loop having headed terminals engaged laterally in the sockets with the heads thereof on the opposite side of the plate to the body head, and the sockets being closed about the terminal portions of the loop behind the heads thereof.

5. In combination with a concrete or like body, a reinforcing rod embedded therein, a loop having a closed end projecting from the body and side arms embedded in the body, and located along opposite sides of a terminal portion of the rod, and means embracing the side arms and rod and securing the same together.

6. In combination with a concrete or like body, a reinforcing rod embedded therein, a loop having a closed end projecting from the body and side arms embedded in the body and located along opposite sides of a terminal portion of the rod, said side arms and terminal portions of the rod having heads, and a connector disposed transversely of the rod and arms and surrounding the same, the head of the rod being located at one side of the connector and the heads of the side arms being located at the opposite side of the connector, said heads and connector being embedded in the connector or like body.

WALTER F. SCHULZ.